F. A. FROMMANN.
VEHICLE WHEEL.
APPLICATION FILED JUNE 2, 1913.
1,173,790.
Patented Feb. 29, 1916.
3 SHEETS—SHEET 2.
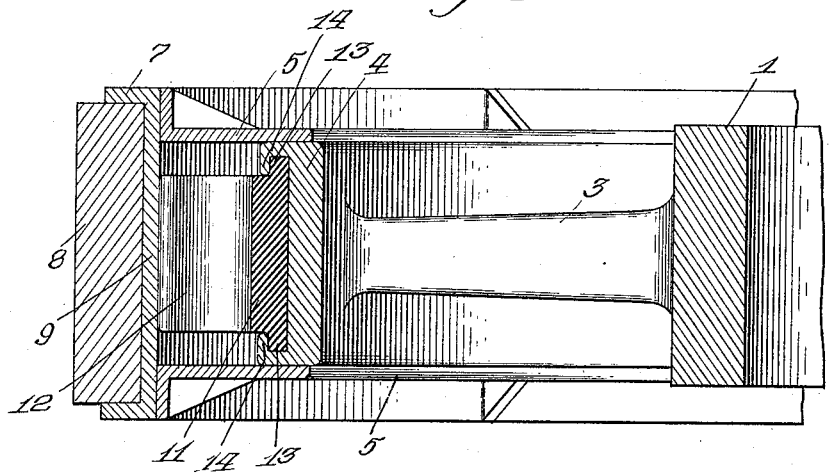
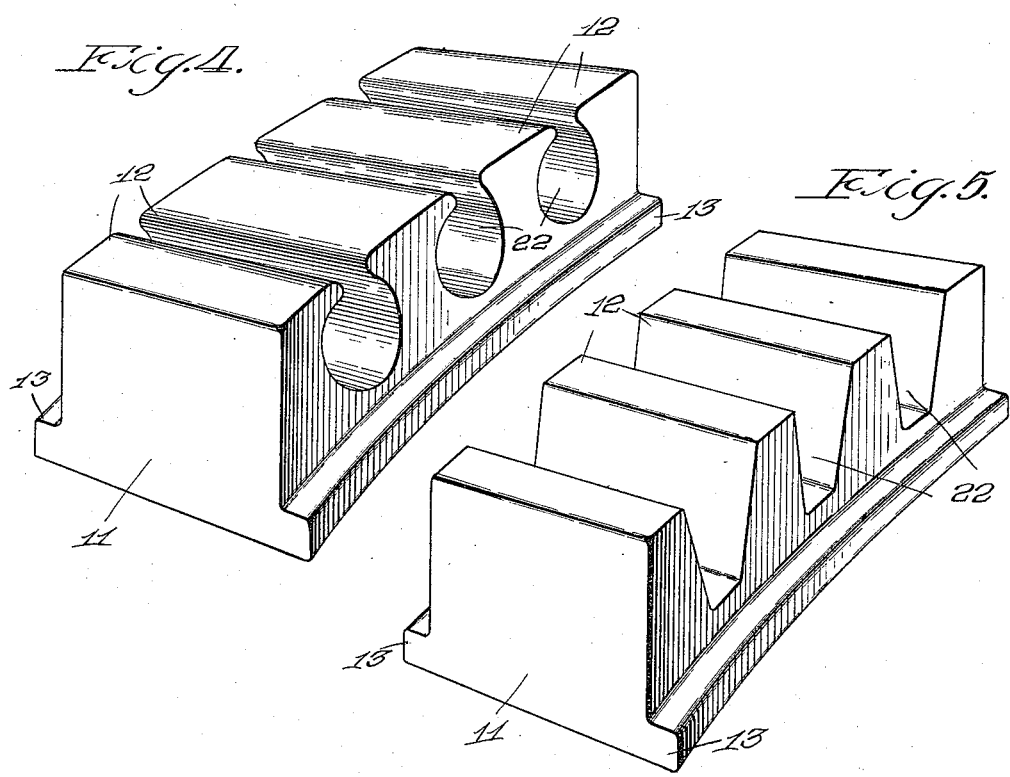
Witnesses:
R. L. Farrington
G. M. Neville
Inventor
Franklin A. Frommann.
By Lotz & Scheibh
Atty.

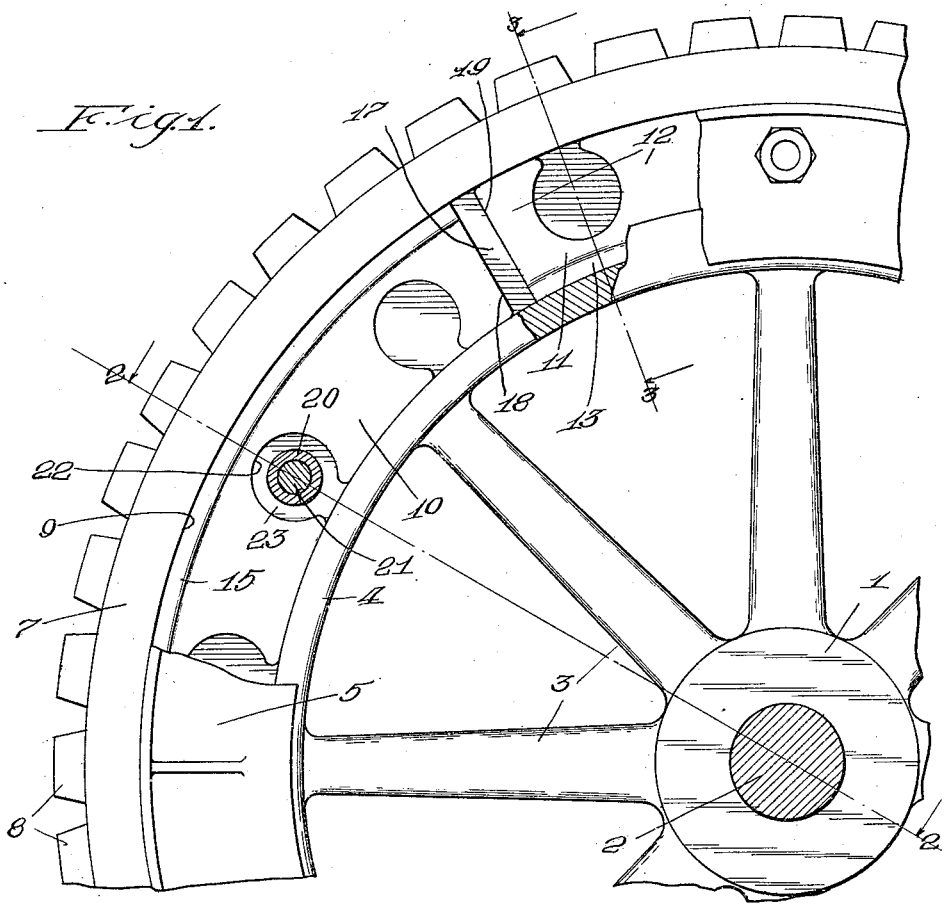
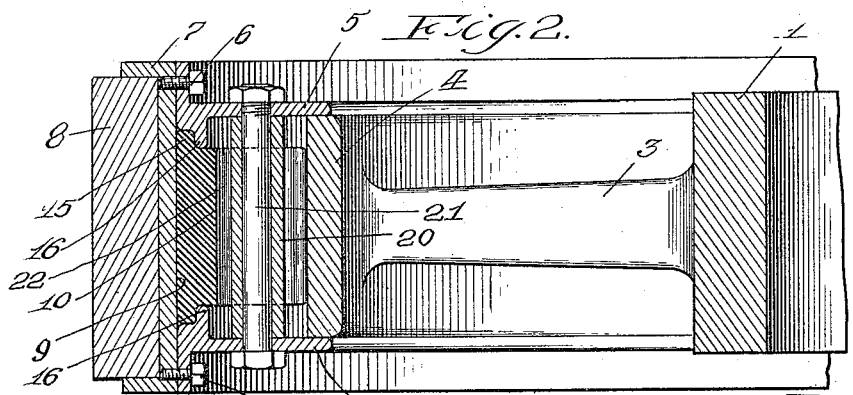

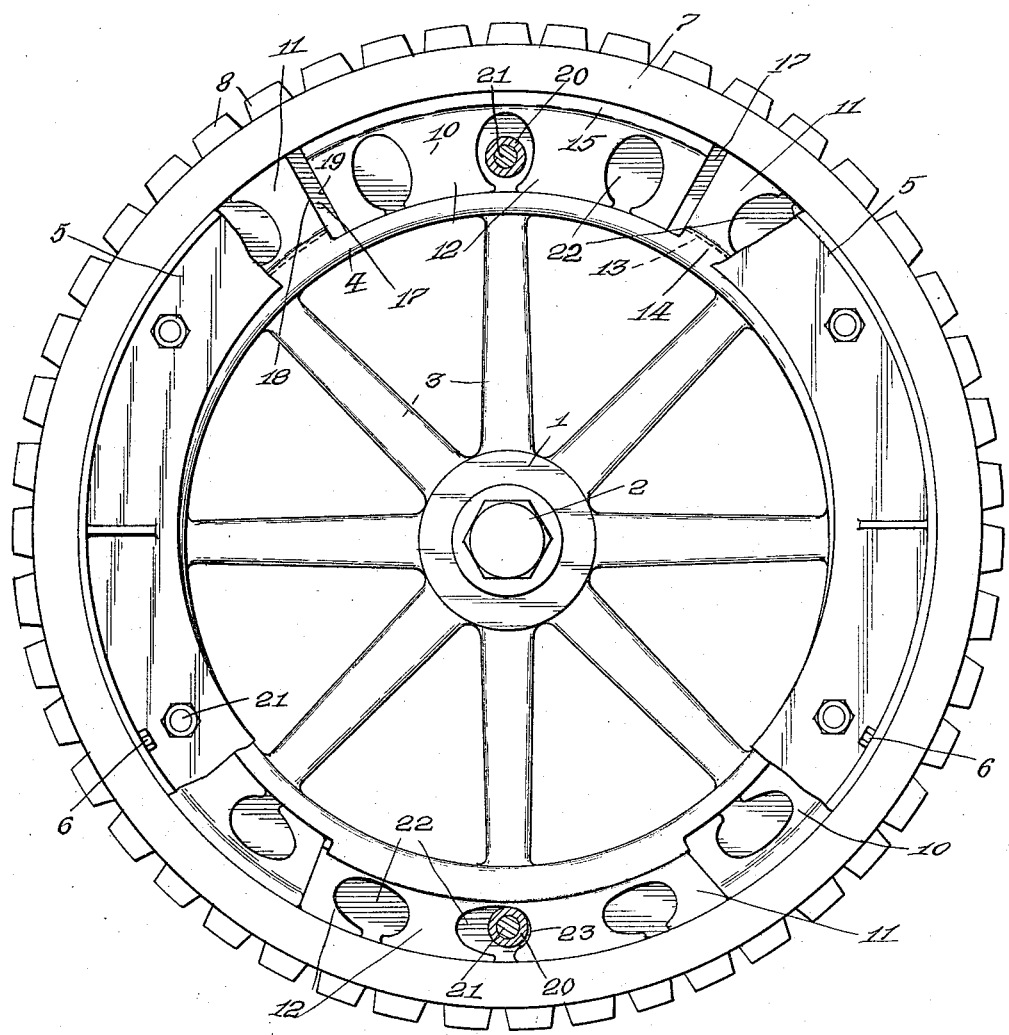

UNITED STATES PATENT OFFICE.

FRANKLIN A. FROMMANN, OF CHICAGO, ILLINOIS, ASSIGNOR TO OLIVE FROMMANN, OF CHICAGO, ILLINOIS.

VEHICLE-WHEEL.

1,173,790.

Specification of Letters Patent. Patented Feb. 29, 1916.

Application filed June 2, 1913. Serial No. 771,251.

*To all whom it may concern:*

Be it known that I, FRANKLIN A. FROMMANN, citizen of the United States, residing at Chicago, in the county of Cook and State of Illinois, have invented certain new and useful Improvements in Vehicle-Wheels; and I do hereby declare the following to be a full, clear, and exact description of the invention, such as will enable others skilled in the art to which it appertains to make and use the same.

My invention relates to inner-cushion wheels, that is to the class of vehicle wheels having cushioning members interposed between the hub portions of the wheels and the rim portions floatingly carried by the latter.

One object of my invention is to provide a wheel construction in which the cushioning elements may be made in a number of sections, each of which may be easily attached or detached, and which may readily be replaced in case of damage to any one section without incurring the expense of providing an entirely new cushioning equipment.

Another object is to provide means for limiting the relative rotation of circumferential movement of the tire and hub members of the wheel, while still affording a sufficient amount of such relative movement to permit the resiliency of the cushioning members to be utilized to advantage.

Still another object is to so dispose the said rotation-limiting members as to permit a considerable relative motion of the wheel parts which are not under compression, while restricting the relative movement at the portion or portions of the wheel in which the cushioning members are under a considerable compression.

In the drawings, Figure —1— is a fragmentary side elevation, partly in section, of a wheel equipped with my invention. Fig. —2— is a radial section through the same along the line 2—2. Fig. —3— is a similar section along the line 3—3. Fig. —4— is a perspective view of one of the cushioning members carried by the hub member of the wheel. Fig. —5— is a perspective view of an alternative form of the cushioning element used in the wheel construction of my invention. Fig. —6— is an elevation, partly in section, of a complete wheel showing the distortion of the cushioning elements supporting the hub member of the wheel.

In the drawings, the wheel construction of my invention is shown as applied to a wheel having an outer rim portion floatingly carried by the hub member of the wheel and laterally guided with respect to the said hub member by means of side flanges fastened to the outer rim and slidably engaging an inner rim carried by the hub and spoke member of the wheel. The hub member of the wheel consists of a hub 1 mounted upon the shaft 2 and carrying spokes 3, the ends of which spokes are secured to a cylindrical rim 4. Slidingly engaging the edges of the rim 4 are annular side plates or flanges 5 which are secured by screws 6 to an outer rim 7. The outer rim in this case is shown as having a channel-shaped section adapted to carry a plurality of thread blocks 8 of wood or other semi-resilient material.

Interposed between the cylindrical rim portion 9 of the channel-shaped outer rim member and the inner rim 4 are a plurality of cushioning members 10 and 11 disposed in annular formation. Each of the cushioning elements 11 consists preferably of a base portion having laterally extended flanges and having outwardly directed legs, the ends of which legs are adapted to bear against the inner surface of the outer rim portion 9. The radially extending leg portions 12 of each cushioning member 11 may be varied considerably in cross-sectional shape as shown by Figs. 4 and 5, but in every case the base portions preferably have laterally extending flanges 13, which flanges are adapted to enter opposed groove formations 14 upon the inner rim 4, whereby the said cushioning members are clenchingly secured to the inner rim member after the manner well known to those familiar with cushioning tires.

Alternating with the cushioning members 11 in annular sequence are similarly constructed cushioning members 10 having base portions adjacent to their radially outer edges and having leg portions extending radially inward, the tips or feet of the said leg portions having centripetal engagement with the periphery of the inner rim member 4. Each of the said cushioning elements 10 preferably has adjacent to its periphery laterally extending flanges 15 adapted to project between a portion of the rim cylinder 9 and the web 16 carried by the adjacent side flanges 5, whereby the said inwardly pediferous cushioning members 10 may be clenchingly secured at their bases to the rim member 7 of the wheel.

While the inwardly and outwardly directed cushioning members 10 and 11 might be abutted at their respective adjacent ends, I preferably make each of the said cushioning members somewhat shorter circumferentially than the radial portion of the wheel in which the same is mounted when there is no strain upon the wheel. Consequently, when the wheel is in service, the tendency of the hub member thereof to lag behind the tire member will permit the said members to move relative to each other for a distance corresponding to the gap 17 in Fig. 1 and for such additional distances as may be permitted by the circumferential compressure and distortion of the cushion portions 18 and 19 adjacent to the said gap. While this contacting of the ends of the respective members 10 and 11 might be sufficient to restrict the relative circumferential movement of the inner and outer wheel portions, it would also tend to slide the cushioning members within the groove formations in which their base portions are clenchingly mounted, and it thereby might permit of an amount of relative motion which would create a needless friction and wear upon the cushioning members. To avoid this, I preferably provide tubular bumpers 20 carried by bolts 21 extending transversely through the side flanges 5 of the outer rim member, each of the said bumpers passing through one of the transverse channels 21 which separate the leg portions of one of the cushioning members. The bumpers 20 are preferably so positioned that they will be entirely out of contact with the adjacent cushioning member, as shown in Fig. 1, when there is no strain upon the wheel. Consequently, the cushioning members will be free to respond both to radial compression strains and to circumferential strains tending to distort the shape of their leg portions until this compression and distortion exceeds the predetermined limit depending upon the distance 23 between the tubular bumper and the walls of the transverse channel 22 through which the said bumper extends transversely of the wheel. When this occurs, the bumper will be called into action as shown in Fig. 6, and will prevent a further circumferential distortion of the adjacent cushioning element and consequently will limit the relative circumferential motion of the inner and outer wheel parts.

When the wheel of my construction is in service, it will be evident from Fig. 6 that strains due to the weight of the vehicle and to the lagging tendency of the tire member will compress and distort the cushions adjacent to the roadway while imposing little, if any, strain upon the cushion near the top of the wheel. Consequently, the bumpers in the lower portion of the wheel will be called into effective action, while the bumpers in the upper portion of the wheel will be out of contact with the cushion portions adjacent to the same and consequently will permit these cushion portions to expand and distend freely. However, as soon as the portions which are shown as uppermost in Fig. 6 approach the roadway, they in turn will be subjected to the strains. Thus the construction of my invention will leave the temporarily upper portions of the cushion formations free to adapt themselves to a considerable relative radial and circumferential motion of the inner and outer rim portions of the wheel, but will always restrict such relative motions in the lower portions of the wheel.

While I have pictured each of the cushioning members of my wheel as having three transverse channels, and as having a bumper extending through the middle one of the said channels, it will be obvious that the number and arrangement of these channels and bumpers, as also other details of my construction might be varied considerably without departing from the spirit of my invention.

For example, it will be evident from Fig. 3 that the bumper tubes 20 also act as spacers for holding the side flanges 5 at the distance required for keeping them in sliding engagement with the edges of the inner rim 4, but the action of the bumper tubes in limiting the distortion and motion of the cushions would be the same if they did not also serve as spacers.

I claim as my invention:

1. In a vehicle wheel, a hub member, a tire member floatingly mounted thereon, an inner rim carried by the hub member, an outer rim carried by the tire member, and a plurality of cushions interposed in annular formation between the said rims, the cushions comprising the said annular formation being attached alternately to the inner rim and the outer rim respectively, the ends of the adjacent cushions being separated by air spaces so as to be out of contact when the said adjacent cushions are not compressed radially of the wheel, the said air spaces enabling said cushions to be circumferentially expanded by radial pressure thereupon.

2. In a vehicle wheel, a hub member, a tire member floatingly mounted thereon, an inner rim carried by the hub member, an outer rim carried by the tire member, and a plurality of transversely channeled cushions interposed in annular formation between the said rims, the cushions comprising the said annular formation being attached alternately only to the inner and the outer rim respectively, the channels in each cushion extending radially to the rim to which the cushion is not attached, the consecutive cushions being separated at their ends by air spaces permitting circumferential expansion and movement of the cushions; and bumpers carried by one of the wheel members and each extending respectively through one of the transverse channels of one of the cushions for limiting the circumferential movement of the cushions with respect to the last named wheel member.

3. In a vehicle wheel, a hub member, a tire member floatingly mounted thereon, an inner rim carried by the hub member, an outer rim carried by the tire member, and a plurality of transversely channeled cushions interposed in annular formation between the said rims, the cushions comprising the said annular formation being attached alternately only to the inner and the outer rim respectively, the channels in each cushion extending radially to the rim to which the cushion is not attached and circumferentially narrowed adjacent to the last named rim; and a bumper carried by one of the wheel members and extending through one of the transverse channels of the said cushions.

4. In a vehicle wheel, a hub member, a tire member floatingly mounted thereon, an inner rim carried by the hub member, an outer rim carried by the tire member, and a plurality of transversely channeled cushions interposed in annular formation between the said rims, the cushions comprising the said annular formation being attached alternately only to the inner and the outer rim respectively, the channels in each cushion extending radially to the rim to which the cushion is not attached; and bumpers carried by one of the wheel members, each thereof extending respectively through a channel in each of said cushions.

5. In a vehicle wheel, a hub member, a tire member floatingly mounted thereon, an inner rim carried by the hub member, an outer rim carried by the tire member, and a plurality of transversely channeled cushions interposed in annular formation between the said rims; and bumpers carried by one of the said members, each of said bumpers extending transversely of the wheel through a channel in one of the said cushions and normally out of contact with the latter.

In testimony whereof I have signed my name in presence of two subscribing witnesses.

FRANKLIN A. FROMMANN.

Witnesses:
  M. M. BOYLE,
  ALBERT SCHEIBLE.

Copies of this patent may be obtained for five cents each, by addressing the "Commissioner of Patents, Washington, D. C."